US008261080B2

(12) United States Patent
Wilkie et al.

(10) Patent No.: US 8,261,080 B2
(45) Date of Patent: Sep. 4, 2012

(54) SYSTEM AND METHOD FOR MANAGING DIGITAL CERTIFICATES ON A REMOTE DEVICE

(75) Inventors: Robert Benjamin Wilkie, Rochester, NY (US); Michelle Bremner, Hilton, NY (US); Shawn Oliver Hurley, Seattle, WA (US)

(73) Assignee: Xerox Corporation, Norwalk, CT (US)

( * ) Notice: Subject to any disclaimer, the term of this patent is extended or adjusted under 35 U.S.C. 154(b) by 1121 days.

(21) Appl. No.: 11/786,660

(22) Filed: Apr. 12, 2007

(65) Prior Publication Data
US 2008/0256358 A1 Oct. 16, 2008

(51) Int. Cl.
*H04L 9/00* (2006.01)
(52) U.S. Cl. .......... 713/175; 713/156; 380/282
(58) Field of Classification Search ............ 713/156, 713/157, 175, 180; 380/277, 282; 726/3, 726/10, 6, 21
See application file for complete search history.

(56) References Cited

U.S. PATENT DOCUMENTS

| 5,299,263 | A | * | 3/1994 | Beller et al. .......... 380/30 |
| 5,805,712 | A | * | 9/1998 | Davis .............. 713/173 |
| 6,108,788 | A | | 8/2000 | Moses et al. |
| 6,370,249 | B1 | | 4/2002 | Van Oorschot |
| 7,454,459 | B1 | * | 11/2008 | Kapoor et al. ........ 709/203 |
| 2003/0126131 | A1 | | 7/2003 | Cihula et al. |
| 2003/0233543 | A1 | | 12/2003 | Nagaratnam |
| 2005/0160259 | A1 | * | 7/2005 | Ogura et al. ........ 713/156 |
| 2005/0246523 | A1 | | 11/2005 | Mauro, II et al. |
| 2006/0200857 | A1 | * | 9/2006 | Yokota ............... 726/6 |
| 2007/0005956 | A1 | | 1/2007 | Zilinskas et al. |

FOREIGN PATENT DOCUMENTS

JP 2006323728 A * 11/2006

OTHER PUBLICATIONS

European Search Report for EP 08 15 3063, dated Apr. 17, 2009.

* cited by examiner

*Primary Examiner* — Samson Lemma
(74) *Attorney, Agent, or Firm* — Fay Sharpe LLP

(57) ABSTRACT

A system and method for managing a digital certificate associated with a remote device is provided. The method includes providing a Web Service Application Programming Interface (API) and communicating digitally between the Web Service API and a remote device, including one of requesting the remote device to perform a task associated with managing digital certificates, and responding to a request from the remote device for performing a task associated with managing digital certificates.

26 Claims, 2 Drawing Sheets

SYSTEM AND METHOD FOR MANAGING DIGITAL CERTIFICATES ON A REMOTE DEVICE

BACKGROUND

In particular, the present disclosure relates to a system and method for managing digital certificates on a remote device.

The present disclosure relates generally to using a computerized workstation to manage digital certificates on remote devices, such as printers. The digital certificates are used for providing secure data transfers to and from the remote devices using a secure interface protocol such as SSL.

The digital certificates use public and private keys. A computerized device's public key is available to other computerized devices, but its private key is only available to itself. A first computerized device sending secure data to a second computerized device may encrypt the data using the second device's public key, and the data may only be decrypted by using the second device's private key, which only the second device has access to. Furthermore, a device's private key may be used to generate a digital signature for securing a document. For additional security, the first device may be provided with a digital certificate which is signed by a certifying authority, thus authenticating the digital certificate. The digital certificate associated with a device uses the private and public keys associated with that device. A device receiving data with a digital certificate uses the public key provided with the digital certificate to decrypt the data.

Presently, remote devices can be configured with digital certificates in a number of ways. In one method, the digital certificate for each remote device is created and stored on the remote device manually, such as by way of a system administrator manually receiving and entering the necessary data from the remote device. In another method, proprietary software, such as scripts, are generated for use with a network, where a computerized workstation communicates with the remote devices for managing their respective associated digital certificates. The software is specially developed for use with the operating system employed by the computerized workstation, for the specific applications used by the workstation and/or the remote devices, and the specific computer languages used by the workstation and/or the remote devices. The software developed for managing the digital certificates may not work on a system that uses a different operating system, different applications or different computer languages.

Still another method presently used is Public Key Infrastructure (PKI), which here refers to a method using software developed for managing certificates on remote devices via a computerized workstation. However, the software is extremely difficult to implement and is not widely used in the industry.

To overcome the drawbacks in the prior art, it is an aspect of the present disclosure to provide a system and method, which is relatively simple to use, for managing digital certificates on remote devices using a computerized workstation, where the system and method is universal and is not sensitive to the particular operating system used by the workstation or the computer language or applications used by the workstation and/or remote devices.

SUMMARY

The present disclosure is directed to a computer workstation for managing a digital certificate associated with a remote device. The workstation includes a processor, and a communication interface for providing digital communication between the processor and a remote device. The workstation further includes a workstation digital certificate management (WKSDCM) software module including a series of programmable instructions executable on the processor forming a Web Service Application Programming Interface (API) for at least one of requesting the remote device to perform a task associated with managing digital certificates, and responding to a request from the remote device for performing a task associated with managing a digital certificate.

The present disclosure is also directed to a method for managing a digital certificate associated with a remote device. The method includes providing a Web Service API and communicating digitally between the Web Service API and a remote device. The communicating includes one of requesting the remote device to perform a task associated with managing digital certificates, and responding to a request from the remote device for performing a task associated with managing digital certificates.

The present disclosure is also directed to a remote device having a processor and a communication interface for providing digital communication between the processor and a workstation. The remote device further includes a remote device digital certificate management (RDDCM) software module including a series of programmable instructions executable on the processor forming a Web Service API for at least one of receiving a request with data from the workstation to perform a task associated with managing a digital certificate, and requesting the workstation to perform a task associated with managing a digital certificate. The RDDCM further performs the requested task using the data.

The present disclosure is further directed to a method for managing a digital certificate associated with a remote device. The method includes providing a Web Service API and communicating digitally between the Web Service API and a workstation. The communicating includes at least one of receiving a request with data from the workstation requesting the remote device to perform a task associated with managing a digital certificate, and requesting the workstation to perform a task associated with managing a digital certificate. The method further includes performing the requested task using the data.

Finally, the present disclosure is directed to a method for managing a digital certificate using a certificate management system. The method includes storing a WKSDCM module and transmitting the WKSCDM module to a workstation. The WKSDCM module includes a series of programmable instructions executable on a processor of a workstation of the certificate management system for managing a digital certificate associated with a remote device of the certificate management system, wherein the managing includes requesting the remote device to perform a task associated with the managing the digital certificates. The series of programmable instructions forms a Web Service API.

Other features of the presently disclosed the digital certificate management system will become apparent from the following detailed description, taken in conjunction with the accompanying drawings, which illustrate, by way of example, the presently disclosed digital certificate management system.

BRIEF DESCRIPTION OF THE DRAWINGS

Various embodiments of the present disclosure will be described below with reference to the figures, wherein.

DETAILED DESCRIPTION

Figure 1:
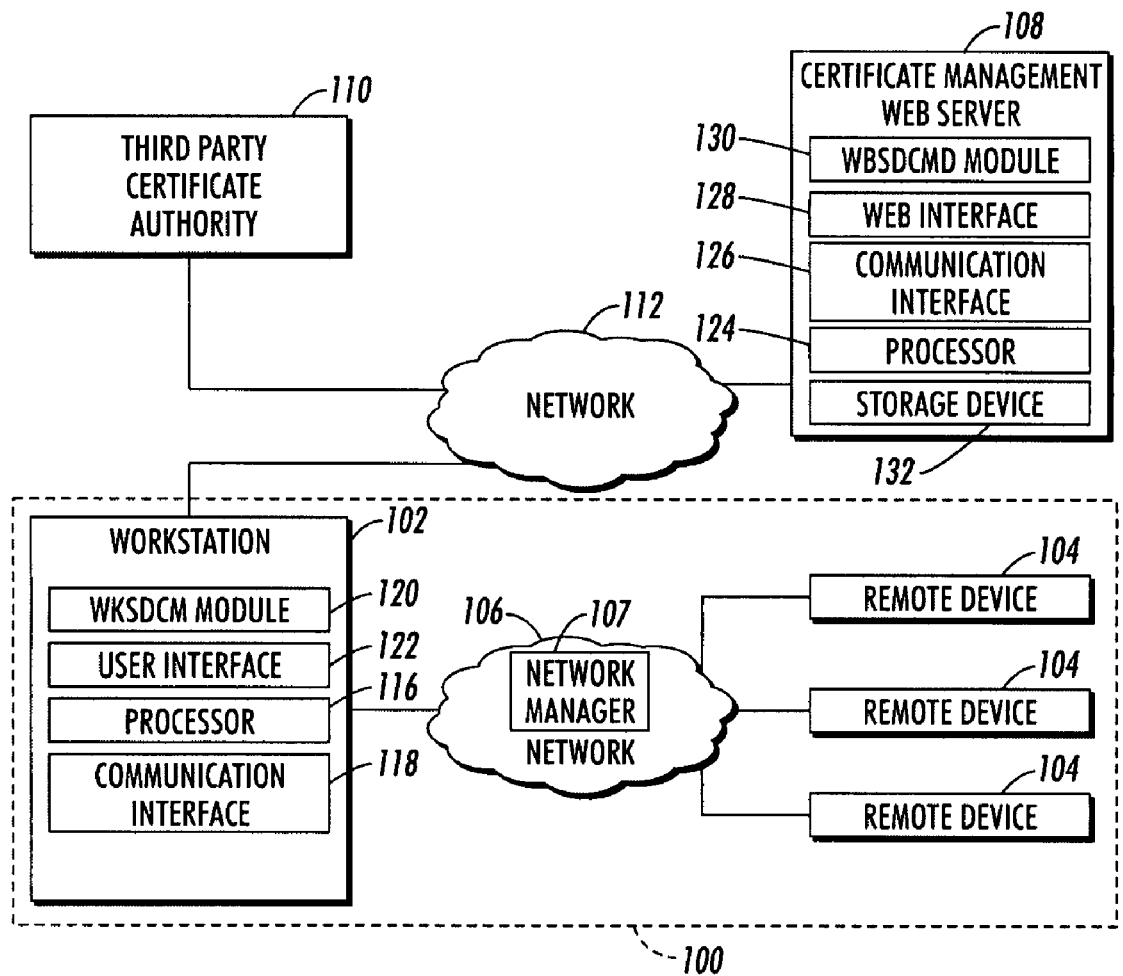
FIG. 1 is a block diagram of a certificate management system in digital communication with a certificate management web server and a third party certificate authority in accordance with the present disclosure.

Referring now to the drawing figures, in which like references numerals identify identical or corresponding elements, a digital certificate management system and method in accordance with the present disclosure will now be described in detail. With initial reference to FIG. 1, an exemplary digital certificate management system 100 in accordance with the present disclosure is illustrated and is designated generally as digital certificate management system 100. Digital certificate management system 100 includes a workstation 102 and a plurality of remote devices 104 networked to the workstation 102 via network 106. The network 106 may include a network manager 106, which may include a network server, database, security manager, configuration server, etc. for managing the flow of data over network 106. The workstation 102 is further in communication with a certificate management web server 108 and a third party certificate authority (CA) 10 via a network 1112, such as the Internet.

The workstation 102 manages digital certificates, such as X.509 digital certificates, to be used by the remote devices 104, including for creating self-signed certificates, creating certificate signing requests (CSRs), uploading signed certificates to the remote device, listing available certificates, getting a particular certificate, getting a CSR, adding a root certificate, getting a particular root certificate, listing available root certificates and deleting a root certificate.

The workstation 102 and the remote device 104 may both store root certificates. The root certificate may be provided by the CA 110 or another trusted site. The root certificate is used to validate certificates used by the digital certificate management system 100 for validating any certificates signed by the CA 110. During communication one of the workstation 102 and the remote device 104 may request verification using the root certificate of the other device. Such communication may be initiated by the remote device 104. The root certificate is used to validate a digital certificate stored by the party that the root certificate verification is requested from to validate that the certificate is secure.

The workstation 102 includes at least one processor 116 and a communication interface 118 which includes the hardware and software necessary for communicating via network 106 and network 112. The workstation 102 further includes a workstation digital certificate management (WKSDCM) software module 120 executable by the processor 116 for managing digital certificates associated with the remote devices 104. The WKSDCM module is an application programming interface (API) written in Web Service Definition Language (WSDL) which is a universal language that is not platform-specific in terms of the architecture of the platform, the operating system of the platform, or the programming language used by the platform, such as for applications. Accordingly, the workstation 102 is not restricted to having a particular architecture, using a particular operating system, or using applications implemented in a particular programming language.

Web Services uses WSDL, Universal Description, Discovery and Integration (UDDI), and Simple Object Access Protocol (SOAP). WSDL is based in Extensible Markup Language (XML) defining Web Services and describing how to access them. The WSDL descriptions allow the software systems of one agent to communicate directly with another agent via a network, such as the World Wide Web, using the SOAP protocol. The two agents may link their SOAP interfaces, provided that security measures are managed properly. An agent may communicate with an unknown agent (e.g., unknown meaning that their respective SOAP interfaces are not linked), by accessing a formal description of the other agent accessible via a directory such as UDDI. The agents may communicate using Hypertext Transfer Protocol (HTTP), a set of rules for exchanging files on the World Wide Web, or a secured version of HTTP, such as HTTPS (which is HTTP over Secure Sockets Layer (SSL).

SOAP uses Web protocols to provide communication between agents specifying how to pass and receive information. Web protocols are installed and available for use by all major operating system platforms. Accordingly, using HTTP, XML and SOAP, one agent can communicate with another, even if the agents are using different operating systems. SSL, or its successor, Transport Layer Security (TLS), which is based on SSL, are commonly-used protocols for managing security of message transmission over the Internet which use a program layer located between the Internet's Hypertext Transfer Protocol (HTTP) and Transport Control Protocol (TCP) layers. The "sockets" part of the term refers to the sockets method of passing data back and forth between a client and a server program in a network or between program layers in the same computer.

The workstation 102 may be, for example, a personal computer, a micro-computer, a mainframe computer, or a hand-held computing device, such as a personal digital assistant (PDA), a cellular phone, etc. The processor 116 may be a microprocessor or the like having access to at least one volatile and/or nonvolatile memory. The communication interface 118 includes hardware and/or software components, e.g., a communication port, an input/output (I/O) adapter, etc, configured for providing communication between the workstation 102 and the remote devices 104, the certificate management web server 108 and the third party certificate authority 110 via network 106 and network 112. The communication interface 118 may provide for wired or wireless communication.

Network 106 and network 112 may be mutually exclusive or share software and/or hardware components. In the example provided, network 112 is the Internet and network 106 is an intranet, such as a wide area network (WAN) or local area network (LAN). Network manager 107 may include at least one server, such as a configuration server, a security manager, etc., and data storage components.

A system administrator (SA) having requisite security rights operates the workstation 102 and activates the WKSDCM module 120. The SA further develops the user interface 122 using commercially available software. The user interface 122 is used to gather data from the user (user entered data) and provide the data to the WKSDCM module 120. The user interface 122 may provide a graphical user interface (GUI) for prompting a user to enter data required by the WKSDCM module 120, gathering the data, and providing the entered data to the WKSDCM module 120 for management of the digital certificates.

Figure 2:
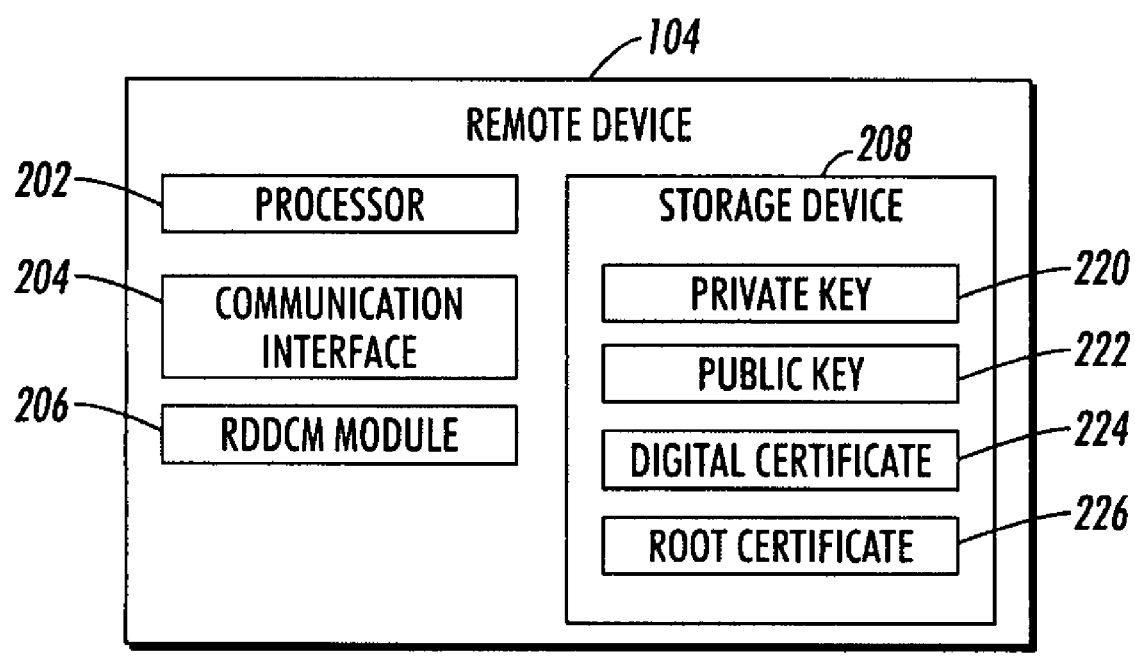
FIG. 2 is a block diagram of a remote device of the certificate management system shown in FIG. 1.

FIG. 2 shows an exemplary remote device 104 in greater detail. The remote device includes at least one processor 202, a communication interface 204, a remote device digital certificate management (RDDCM) software module 206 and a storage device 208. The remote device 104 may be another workstation, a printer device, a consumer electronic device, etc. In the present example, the remote device 104 is a printer device. The term "printer device" as used herein encompasses any apparatus or system, such as a digital copier, xerographic printing system, ink jet printing system, reprographic printing system, bookmaking machine, facsimile machine, multifunction machine, textile marking machine, etc., which performs a marking output function for any purpose.

The processor 202 may be a microprocessor or the like having access to at least one volatile and/or nonvolatile memory, including storage device 208. The communication interface 204 includes hardware and/or software components, e.g., a communication port, an input/output (I/O) adapter, etc, configured for providing communication between the workstation 102 and the remote devices 104, the certificate management web server 108 and the third party certificate authority 110 via network 106 and network 112. The communication interface 204 may provide for wired or wireless communication.

The RDDCM module 206 communicates with the WKSDCM module 102 of the workstation 102 as needed when the WKSDCM module 102 manages digital certificates for the remote device 104, including accessing and/or managing the private key 220, public key 222, digital certificate 224 and/or root certificate 226 stored on the storage device 208. In the present example, the RDDCM module 206 is installed at the time of manufacture or installed via a software upgrade.

The certificate management web server 108 has at least one processor 124, a communication interface 126, a web interface 128, a web server digital certificate management distribution software (WBSDCMD) module 130, and a storage device. The processor 124 may be a microprocessor or the like having access to at least one volatile and/or nonvolatile memory. The communication interface 126 includes hardware and/or software components, e.g., a communication port, an input/output (I/O) adapter, etc, configured for providing communication between the certificate management web server 108 and the network 112. The communication interface 126 may provide for wired or wireless communication.

The web interface 128 provides an interface to clients for receiving client requests and providing clients with a requested product. In the present example, a client request is generated by the workstation 102. The web interface 128 collects data related to the client request, which may include collecting payment information and the product being requested. The WBSDCMD module 130 includes a series of programmable instructions executable by the processor 124. The WBSDCMD module 130 processes the request, retrieves the product requested from the storage device 132, and provides the product requested to the web interface 128. The storage device 132 stores products, including the WKSDCM module 120. The web interface 128 provides the product to the client, e.g., via an upload operation. In the present example, the workstation 102 requests to purchase the WKSDCM module 120, transacts the purchase, downloads the WKSDCM module 120 from the certificate management web server 108, and installs it.

The WKSDCM software module 120, the RDDCM software module 206, and the WBSDCMD software module 130 may be provided by the certificate management web server 108, such as via a download operation as propagated signals, or as stored on a removable storage medium such as a CD. The provision of the aforementioned software modules by the certificate management web server 108 may be for a fee. Each of the software modules, e.g., the WKSDCM module 120, RDDCM module 206, and the WBSDCMD module 130 module includes a series of programmable instructions capable of being executed by the associated processor, e.g., processor 116, 202, and 124, respectively. The series of programmable instructions can be stored on a computer-readable medium, such as RAM, a hard drive, CD, smart card, 3.5" diskette, etc., or transmitted via propagated signals as described above for being executed by the associated processor 116, 202, and 124, respectively, for performing the functions disclosed herein and to achieve a technical effect in accordance with the disclosure.

Operational steps for managing a request to create a certificate, such as a self-signed certificate, a CSR, or a root certificate are now described. Using the user interface 122, the SA enters the request. Via the user interface 122, the WKSDCM module 120 prompts the SA to enter the nature of the request and data which is needed for processing the request and which may be entered into a certificate being created. The data may include, for example, an administrative password which authorizes the certificate creation, the date and/or time interval for which the self-signed certificate is to be valid, a country code, identification of the remote device 104 for which the self-signed certificate is being requested, and identification data, e.g., location information including a country code, state, and street address, organization unit identification, and an email address for the SA. Furthermore, the request identifies the particular remote device 104 that the request is directed to.

The WKSDCM module 120 sends the request, including the data entered by the SA, to the RDDCM module 206 of the remote device 104 identified. When the request is a request to generate a self-signed certificate the RDDCM module 206 accesses the stored private and public keys, generates the self-signed certificate using the data provided with the request and the private and/or public keys, and stores it on the storage device 208. Then the RDDCM module 206 notifies the WKSDCM module 120 as to the success of the certificate creation, and the WKSDCM module 120 notifies the SA via the user interface 122.

Instead of using a self-signed digital certificate, the remote device 104 may use a signed digital identity certificate which is signed by a trusted third party, such as a CA. The CSR, which is a certificate with a request to sign the certificate, is sent by the WKSDCM module 120 to the trusted third party, such as a CA having the authority to sign digital certificates for use by other parties. The CA may be, for example, a free CA, a CA associated with institutions and governments, or a commercial CA that charge for their services. The CA returns the signed digital identity certificate to the WKSDC module 120.

When the RDDCM module 206 of a remote device 104 receives a request from the WKSDCM module 120 to create a CSR, it uses data included with the request and the private and/or public keys to create the CSR. Once created, the RDDCM module 206 sends the created CSR to the WKSDCM module 120. Preferably the RDDCM module 206 stores the CSR locally on storage device 208. In a well known type of CSR, the CSR includes the public key and is signed by the private key of the CA. If the CSR creation failed at the remote device 104, the RDDCM module 206 returns an error message to the WKSDCM module 120 which notifies the SA via the user interface 122 of the status of the CSR creation. Provided that the CSR creation was successful, the WKSDCM 120 sends the CSR to the CA 110 via network 112. Sending the CSR to the CA 110 may be performed automatically upon receipt of the CSR by the WKSDCM module 120 from the RDDCM 206 without any SA intervention.

The CA signs the certificate and sends the signed digital identity certificate to the WKSDCM 120. The WKSDCM 120 uploads the signed certificate to the appropriate remote device 104, including providing the signed certificate together with an administrative password to the RDDCM module 206 of the remote device 104. The RDDCM module 206 installs the signed certificate, including storing it on the storage device 208.

The providing of the signed certificate by the WKSDCM 120 to the RDDCM module 206 may be performed automatically upon receipt of the signed certificate from the CA without any SA intervention, wherein the providing of the signed certificate includes notifying the RDDCM module 206 that the signed certificate is ready for installation. Furthermore, the installing of the signed certificate by the RDDCM module 206 may also be performed automatically upon notification from the WKSDCM 120 that the signed certificate is ready for installation without any SA intervention. If the signed certificate is successfully installed, the RDDCM module 206 notifies the WKSDCM 120 of the successful installation, and otherwise sends an error message to the WKSDCM 120 which notifies the SA via the user interface 122.

The WKSDCM 120 may also send a request for a root certificate to the CA 110 via network 112. The CA provides a signed root certificate, also known as a trusted root certificate when the CA is a trusted CA, to the WKSDCM 120. The WKSDCM 120 uploads the root certificate to the appropriate remote device 104, including providing the root certificate together with an administrative password to the RDDCM module 206 of the remote device 104. The RDDCM module 206 installs the root certificate, including storing it on the storage device 208. The WKSDCM 120 may also upload a root certificate which originated from itself or another trusted site to the RDDCM module 206 of the remote device 104.

Additionally, the WKSDCM 120 may generate a request for the RDDCM module 206 to provide it with a particular previously created self-signed digital certificate, third party signed digital certificate, CSR, or root certificate. The RDDCM module 206 responds by retrieving the requested certificate or a list of the requested type of certificate from the storage device 208 and sending it to the WKSDCM 120.

Furthermore, the RDDCM 206 may initiate communication and request the WKSDCM 120 to perform a task related to managing digital certificates. Initiation of communication may occur, for example, when the remote device 104 generates an email or transmits a document, such as a file including a scanned document. In one example, the RDDCM 206 may request the WKSDCM 120 to use a root certificate to verify another certificate.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer workstation for managing a digital certificate associated with a remote device comprising:
    a processor;
    a communication interface for providing digital communication between the processor and a remote device via a first network; and
    a workstation digital certificate management (WKSDCM) software module included on a workstation and further including a series of programmable instructions executable by the processor forming a Web Service Application Programming Interface (API) written in a language that is universal to an architecture and operating system of the processor and to a programming language used by applications that are executed by the processor that the API interfaces with, the WKSDCM module being adapted to:
        transmit a request to the remote device for creating a certificate via the first network;
        in response to receiving the certificate from the remote device via the first network, relay via a second network the certificate to an associated third party with a request for a signature;
        in response to receiving the certificate signed by the associated third party via the second network, upload the certificate to the remote device via the first network.

2. The workstation in accordance with claim 1, further comprising a user interface providing a graphical user interface (GUI), wherein a user enters data via the user interface and the user interface provides the user entered data to the WKSDCM module; and
    wherein the workstation communicates with the remote device using Simple Object Access Protocol (SOAP).

3. The workstation in accordance with claim 1, wherein the request includes data selected from the group of data consisting of an administrative password validating the request, identification data identifying at least one of the remote device and the workstation, and time interval data describing a time interval for which an entity created via the task is valid.

4. The workstation in accordance with claim 3, wherein:
    the certificate is of the type of certificate selected from the group of certificate types consisting of a self-signed certificate, a certificate signing request (CSR), a certificate digitally signed by a certifying authority (CA), and a root certificate; and wherein the workstation is further adapted to request the remote device perform a task selected from the group consisting of:
    retrieving a particular certificate, adding a certificate provided with the request, listing available certificates of at least one certificate type specified in the request, verifying another certificate, deleting a particular certificate, and a combination of the above.

5. A method for managing a digital certificate associated with a remote device comprising:
    executing by a tangible processor a Web Service Application Programming Interface (API) written in a language that is universal to an architecture and operating system of the processor and to a programming language used by applications that are executed by the processor and that the API interfaces with;
    communicating digitally via a tangible communication interface between the processor executing the Web Service API and a remote device via a first network, the communicating comprising:
    receiving from the remote device via the first network a certificate signing request (CSR) created by the remote device;
    upon receiving the CSR, transmitting via a second network the CSR to a third party for digital signing;
    receiving a signed digital security certificate from the third party via the second network and uploading the digital security certificate to the remote device via the first network;
    storing at the remote device the digital security certificate;
    requesting by the processor for the remote device to perform a task associated with managing digital certificates; and
    responding by the processor to a request from the remote device for performing a task associated with managing digital certificates.

6. The method according to claim 5, wherein the requesting includes providing data to the remote device, wherein the data is selected from the group of data consisting of an administrative password validating the request, identification data identifying at least one of the remote device and the workstation, and time interval data describing a time interval for which an entity created via the task is valid; and
    wherein the workstation communicates with the remote device using Simple Object Access Protocol (SOAP).

7. The method according to claim 5, wherein the certificate is of the type of certificate selected from the group of certificates types consisting of a self-signed certificate, a certificate signing request (CSR), a certificate digitally signed by a certifying authority (CA), and a root certificate.

8. The method according to claim 7, wherein the tasks are selected from the group of tasks consisting of uploading a certificate provided with the request, retrieving a particular certificate, adding a certificate provided with the request, listing available certificates of at least one certificate type specified in the request, verifying another certificate, and deleting a particular certificate.

9. A remote device comprising:
    a processor;
    a communication interface for providing digital communication between the processor and a computer workstation; and
    a remote device digital certificate management (RDDCM) software module including a series of programmable instructions executable by the processor forming a Web Service Application Programming Interface (API) written in a language that is universal to an architecture and operating system of the processor and to a programming language used by applications that are executed by the processor and that the API interfaces with for:
        receiving from the workstation a first request with data, the first request being for a certificate;
        creating a certificate;
        transmitting to the workstation the certificate with a second request for a signature;
        receiving from the workstation a signed certificate;
        installing the signed certificate;
        subsequently receiving from the workstation a third request for performing a task associated with managing the certificate; and
        performing the requested task using the data.

10. The remote device in accordance with claim 9, further comprising a storage device storing at least one key selected from the group of keys consisting of a private key and a public key; and
    wherein the remote device communicates with the workstation using Simple Object Access Protocol (SOAP).

11. The remote device in accordance with claim 10, wherein:
    the certificate is of the type of certificate selected from the group of certificates types consisting of a self-signed certificate, a certificate signing request (CSR), a certificate digitally signed by a certifying authority (CA), and a root certificate; and
    the task which the workstation requests of the remote device to perform and the task requested by the remote device for the workstation to perform are each tasks selected from the group of tasks consisting of retrieving a particular certificate, adding a certificate provided with the request, listing available certificates of at least one certificate type specified in the request, verifying another certificate and deleting a particular certificate.

12. The remote device in accordance with claim 11:
    wherein the RDDCM module is adapted to create the certificate by retrieving a key of the stored at least one key, generating the self-signed certificate using the retrieved key and the data provided with the request, and performing at least one of storing the created certificate on the storage device, notifying the workstation with respect to the status of the certificate creation, and transmitting the created certificate to the workstation;
    wherein when the task is uploading a certificate the RDDCM module stores a certificate provided with the request on the storage device;
    wherein when the task is retrieving a particular certificate the RDDCM module retrieves the certificate requested from the storage device and transmits it to the workstation;
    wherein when the task is adding a certificate the RDDCM module stores a certificate provided with the request on the storage device;
    wherein when the task is listing available certificates the RDDCM module generates a listing of certificates of a type requested and transmits the listing to the workstation; and
    wherein when the task is deleting a particular certificate, the RDDCM module deletes the specified certificate from the storage device.

13. A method for managing a digital certificate associated with a remote device comprising:
    providing a Web Service Application Programming Interface (API) executable by a tangible processor that is written in a language that is universal to an architecture and operating system of the processor and to a programming language used by applications that are executed by the processor and that the API interfaces with;
    communicating digitally via tangible communication interface between the processor executing the Web Service API and a computer workstation, comprising:
        receiving data transmitted from the workstation with a request for a certificate;
        accessing a public and private keys from storage and using the keys for creating a certificate;
        transmitting the certificate to the workstation with a request for a signature; and,
        receiving the signed certificate from the workstation; and,
        storing the signed certificate until determining receipt of a task request provided by the workstation.

14. The method according to claim 13, further comprising storing by the processor at least one key selected from the group of keys consisting of a private key and a public key;
    wherein the remote device communicates with the workstation using Simple Object Access Protocol (SOAP).

15. The method according to claim 14, wherein the certificate is of the type of certificate selected from the group of certificates types consisting of a self-signed certificate, a certificate signing request (CSR), a certificate digitally signed by a certifying authority (CA), and a root certificate.

16. The method according to claim 15, wherein the task which the workstation requests of the remote device to perform and the task requested by the remote device for the workstation to perform are each tasks selected from the group of tasks consisting uploading the certificate provided with the request, retrieving a particular certificate, adding a certificate provided with the request, listing available certificates of at least one certificate type specified in the request, verifying another certificate, and deleting a particular certificate; and the remote device is capable of executing a request from the workstation for the remote device to create a certificate.

17. The method according to claim 16:
wherein the creating the certificate includes:
retrieving a key of the stored at least one key;
generating the self-signed certificate using the retrieved key and the data provided with the request; and
performing at least one of:
storing the created certificate on the storage device, notifying the workstation with respect to the status of the certificate creation, and transmitting the created certificate to the workstation;
wherein when the task is uploading a certificate, the method includes storing a certificate provided with the request on the storage device;
wherein when the task is retrieving the certificate, the method includes:
retrieving the certificate requested from the storage device; and
transmitting it to the workstation;
wherein when the task is adding the certificate, the method includes:
storing a certificate provided with the request on the storage device;
wherein when the task is listing available certificates, the method includes:
generating a listing of a type of certificates requested; and
transmitting the listing to the workstation; and
wherein when the task is deleting a certificate, the method comprises deleting the certificate from the storage device.

18. A method for managing a digital certificate using a certificate management system, the method comprising:
storing by a storage device a workstation digital certificate management (WKSDCM) software module including a series of programmable instructions executable on a processor of a workstation of the certificate management system for managing a digital certificate associated with a remote device of the certificate management system;
transmitting from the workstation a request for a certificate via a first network;
in response to receiving the request, creating by the remote device the certificate at the remote device;
in response to the creating, transmitting the certificate by the remote device via the first network;
in response to receiving the certificate at the workstation, providing the certificate to a third party via a second network different from the first network;
receiving a signed certificate at the workstation via the second network and uploading the signed certificate to the remote device via the first network wherein the series of programmable instructions forms a Web Service Application Programming Interface (API) written in a language that is universal to an architecture and operating system of the processor and to a programming language used by applications that are executed by the processor and that the API interfaces with; and
transmitting via a tangible communication interface the WKSCDM module to the workstation.

19. The method according to claim 18, wherein:
the certificate is of the type of certificate selected from the group of certificates types consisting of a self-signed certificate, a certificate signing request (CSR), a certificate digitally signed by a certifying authority (CA), and a root certificate; and
wherein the method further includes: subsequently retrieving a particular certificate, adding a certificate provided with the request, listing available certificates of at least one certificate type specified in the request, and deleting a particular certificate.

20. The method according to claim 18, wherein the storing and transmitting is performed by a web server that provides an interface to receive a request for the WKSDCM from the workstation and provide the workstation with the WKSDCM module.

21. The workstation in accordance with claim 1, wherein the request from the remote device is initiated by the remote device and includes a request for the WKSDCM to perform a task related to managing digital certificates associated with the remote device.

22. The workstation in accordance with claim 1, wherein the request from the remote device generated as at least one of an email generated by the remote device, a document transmitted by the remote device, and a request for WKSDCM to use a root certificate to verify another certificate.

23. The workstation in accordance with claim 1, wherein the remote device is a printer device.

24. The remote device in accordance with claim 9, wherein the request from the remote device is initiated by the remote device and includes a request for the WKSDCM to perform a task related to managing digital certificates associated with the remote device.

25. The remote device in accordance with claim 9, wherein the request from the remote device generated as at least one of an email generated by the remote device, a document transmitted by the remote device, and a request for WKSDCM to use a root certificate to verify another certificate.

26. The remote device in accordance with claim 9, wherein the remote device is a printer device.

* * * * *